United States Patent [19]

Fukushima et al.

[11] Patent Number: 5,072,317
[45] Date of Patent: Dec. 10, 1991

[54] RECORDING AND/OR REPRODUCING APPARATUS HAVING A MECHANICAL MEMORY FOR STORING MEDIUM LOADING AND UNLOADING INFORMATION

[75] Inventors: Nobuo Fukushima; Masaya Maeda; Nobuo Tezuka, all of Kanagawa, Japan

[73] Assignee: Canon Kabushiki Kaisha

[21] Appl. No.: 382,006

[22] Filed: Jul. 17, 1989

Related U.S. Application Data

[63] Continuation of Ser. No. 90,422, Aug. 26, 1987, abandoned, which is a continuation of Ser. No. 826,117, Feb. 5, 1986, abandoned.

[30] Foreign Application Priority Data

Feb. 7, 1985 [JP] Japan .................................. 60-22633

[51] Int. Cl.⁵ ........................ G11B 19/02; G11B 19/10
[52] U.S. Cl. ......................................... 360/71; 360/75; 360/99.02; 369/53; 369/58; 369/233
[58] Field of Search ....................... 360/55, 60, 71, 75, 360/78.01, 78.04, 86, 96.5, 96.6, 97.01, 98.01, 98.04–98.06, 99.02, 99.03, 99.07, 105, 137, 5, 6; 358/906, 909; 369/233, 34, 30, 32, 33, 37, 53, 58, 75.1, 76, 79

[56] References Cited

U.S. PATENT DOCUMENTS

| | | | |
|---|---|---|---|
| 3,678,215 | 7/1972 | Kihara | 360/132 |
| 3,872,509 | 3/1975 | Yoshii | 360/137 |
| 4,527,265 | 7/1985 | d'Alayer de Costemore d'Arc | 369/233 |
| 4,578,722 | 3/1986 | Lovgren et al. | 360/135 |
| 4,691,252 | 9/1987 | Okada et al. | 360/75 |

FOREIGN PATENT DOCUMENTS

| | | | |
|---|---|---|---|
| 1220628 | 7/1966 | Fed. Rep. of Germany . | |
| 54-140507 | 10/1979 | Japan | 360/78 |
| 56-140572 | 11/1981 | Japan | 360/96.5 |

OTHER PUBLICATIONS

American Heritage Dictionary, Second Edition, Houghton Mifflin company, Boston, Mass., 1982, p. 669.

Primary Examiner—Aristotelis Psitos
Assistant Examiner—Steven R. Garland
Attorney, Agent, or Firm—Toren, McGeady & Associates

[57] ABSTRACT

A recording or reproducing apparatus is provided with a device for detecting and memorizing the replacement of a recording medium made even after a power supply is cut off. This prevents any error from occurring in a preset sequence of automatic operation processes to be carried out after the power supply is switched on, such as an automatic blank recording-track detecting operation.

37 Claims, 11 Drawing Sheets

FIG.2
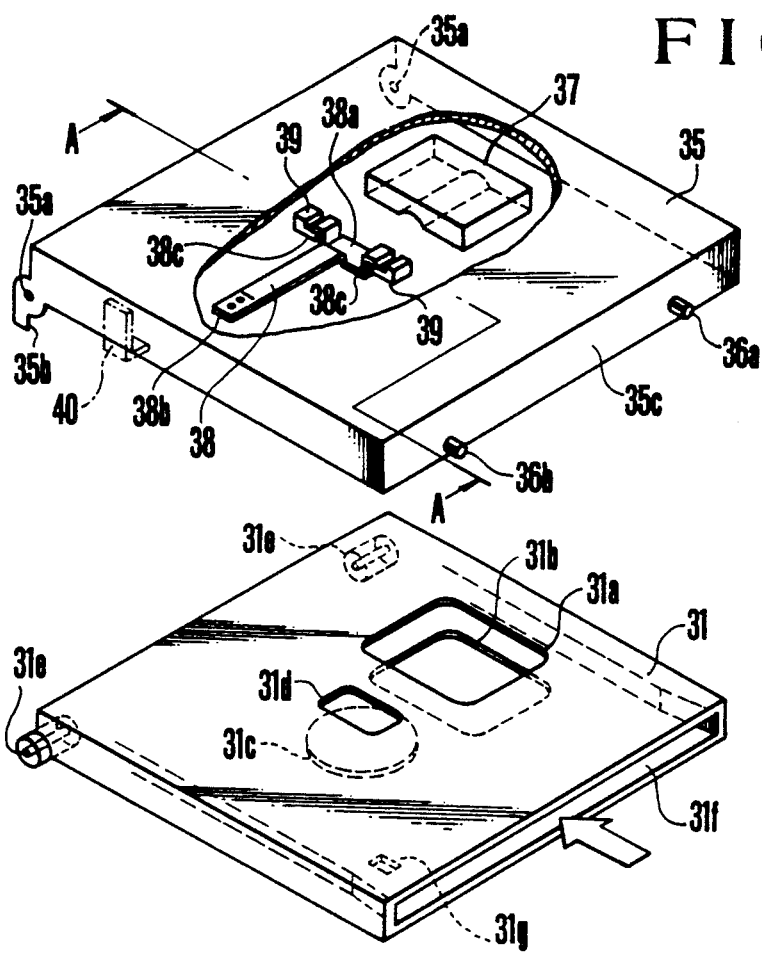
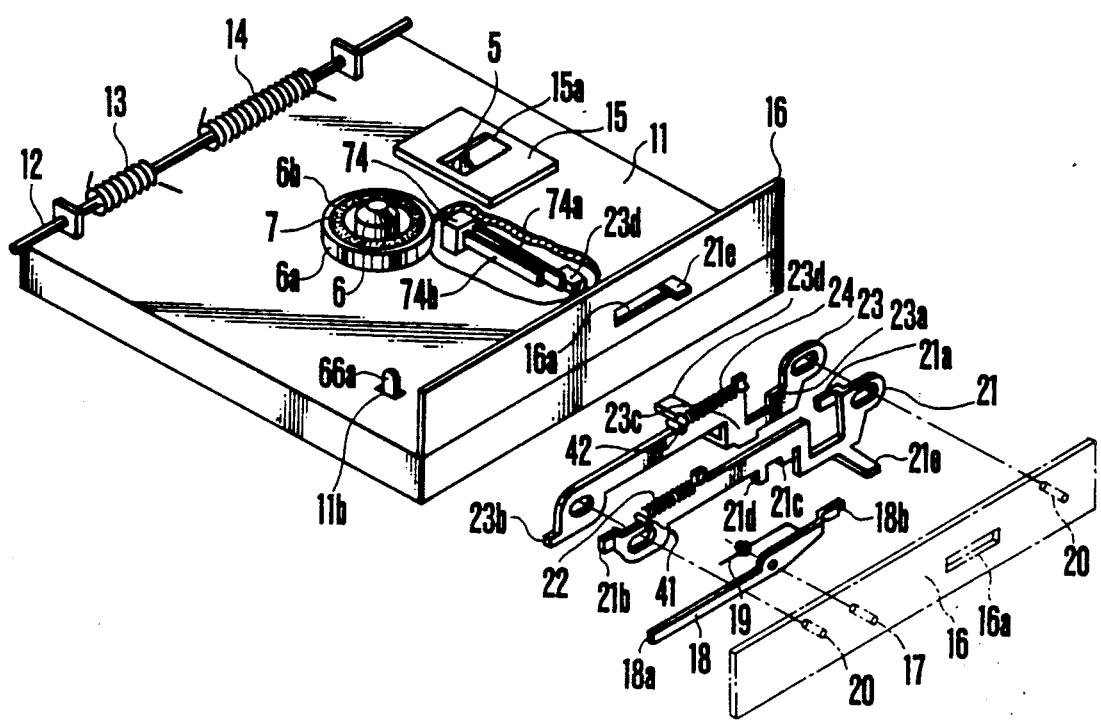

RECORDING AND/OR REPRODUCING APPARATUS HAVING A MECHANICAL MEMORY FOR STORING MEDIUM LOADING AND UNLOADING INFORMATION

This is a continuation of application Ser. No. 07/090,422, filed Aug. 26, 1987, now abandoned; which is a continuation of Ser. No. 06/826,117, filed Feb. 5, 1986, now abandoned.

BACKGROUND OF THE INVENTION

1. Field of the Invention

This invention relates to a recording apparatus, and more particularly to a recording apparatus which permits a recording medium to be replaced with another recording medium 2. Description of the Prior Art The known recording apparatuses include the kind having a movable head for recording on a rotary recording medium, such as a magnetic disc or a magnetic cylinder, a unit length of information (such as one field or one frame portion of a video signal or the like) in each of recording tracks which are formed in a concentric circular shape or in an annular shape on the recording medium accordingly, as the information is recorded. In preventing overlapped recording in recording the information with the apparatus of this kind, for example, the head must be first accurately positioned at an unrecorded part of the recording medium. In accordance with a known method employed in the conventional apparatus, a desired recording position of the head on the recording medium is checked for the presence or absence of any previous record there before recording. In the event of the presence of a previous record, the head is shifted to a next desired recording position. The head is thus positioned at an unrecorded part of the recording medium with such a check-up process repeated before recording. An example of this method is disclosed in Japanese Laid-Open Patent Application No. SHO 54-140515.

In the recording apparatus arranged in this manner, with a control sequence arranged to include a process of shifting the head to a next recording position either upon completion of recording in one position or at the start of a next recording process, the present recording position of the head on the recording medium serves as a datum point for determining the next recording position on the medium. Therefore, even in cases where the power supply is switched off or where, in the event of a portable apparatus, the power source battery is taken out for replacement or for charging or where the battery voltage drops below a threshold value and becomes unserviceable, the head can be shifted accurately to the next position on the same recording medium in relation to the present head position when the power supply is again switched on or has recovered its voltage, unless in the meantime the head is shifted to some other position. Such an accurate shift of the head position enables the apparatus to resume a recording operation without overlapping the record nor leaving any unnecessary unrecorded part (blank tracks).

However, if the recording medium is replaced with another recording medium while the power supply is off due to some reason as mentioned above, the present head position becomes meaningless and is no longer usable as a datum point. Then, resumption of recording under that condition either results in overlapped recording or blank recording tracks. To avoid this trouble, the above-stated process of positioning the head for an unrecorded part on the recording medium must be carried out every time the power supply is switched on. However, since the fact that the recording medium has been replaced is not confirmed, this method is unreasonable. Besides, this method deprives the apparatus of prompt recording under all conditions. Further, in the event of a portable apparatus, the method presents a serious problem as it quickens the consumption of the power supply battery.

Problems similar to the above-stated ones are likely to occur also in recording apparatuses of other kinds arranged to shift recording conditions, such as switching use of one head over to another according to the properties or kind of the recording medium.

SUMMARY OF THE INVENTION

It is an object of this invention to provide a recording apparatus which is of the kind permitting the replacement or interchange of a recording medium with another and is provided with means for mechanically memorizing the removal of the recording medium or the loading of a new recording medium so that the above-stated problems of the prior art can be solved.

It is another object of this invention to provide a recording or reproducing apparatus which does not perform any erroneous operation when a recording medium is replaced with another recording medium in a state of having no power supply.

To attain these objects, a recording apparatus which is of the kind permitting the replacement of the recording medium and is arranged as an embodiment of this invention, is provided with means for mechanically memorizing the removal of the recording medium or loading of a new recording medium. The memory means mechanically memorizes the replacement of the recording medium when it is replaced and enables the apparatus to find without fail, at the time of a next recording operation, whether the recording medium has been replaced or not on the basis of the information stored in the memory means.

Another recording apparatus which is also of the kind permitting the recording medium to be replaced and is arranged as another embodiment of this invention, comprises: a movable recording head; positioning means for positioning the recording head on the recording medium loaded on the apparatus; memory means for mechanically memorizing either that the recording medium is taken out or that another recording medium is newly loaded; and control means for controlling the positioning means according to the memorizing state of the memory means.

The recording apparatus which is arranged as described above according to this invention, is capable of finding out without fail the replacement of the recording medium made while the apparatus is receiving no power supply and is capable of rapidly performing a recording operation accurately conforming to conditions obtained after the replacement or no replacement of the recording medium.

These and further objects and features of this invention will become apparent from the following detailed description of preferred embodiments thereof taken in connection with the accompanying drawings.

BRIEF DESCRIPTION OF THE DRAWINGS

FIG. 2 is an oblique exploded view showing the embodiment of this invention and particularly the cassette and disk loading arrangement thereof.

DETAILED DESCRIPTION OF THE PREFERRED EMBODIMENTS

Figure 1:
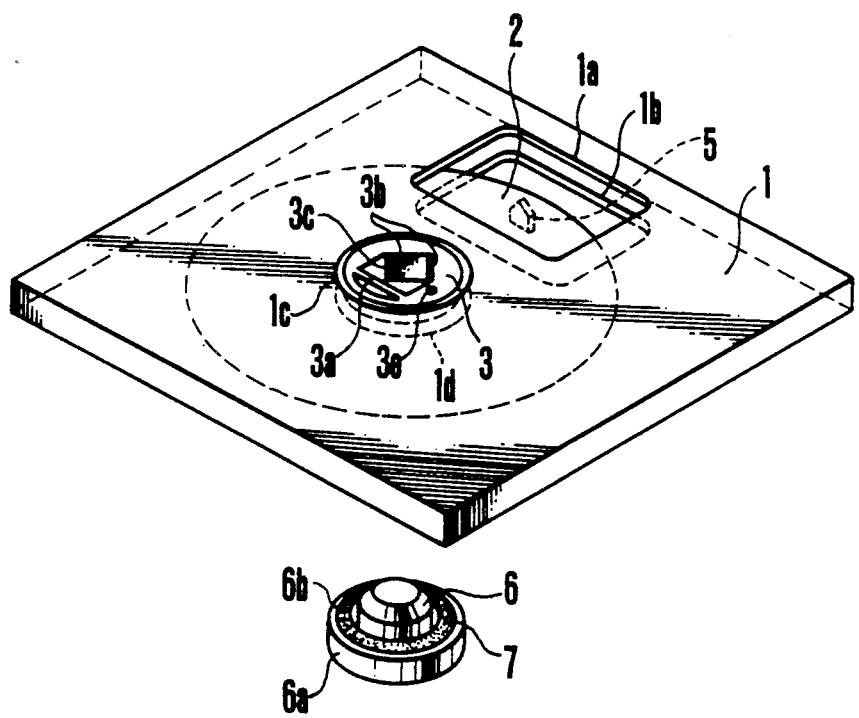
FIG. 1 is an oblique view showing a recording medium and its carrier usable by a recording or reproducing apparatus arranged as an embodiment of this invention, the illustration also including a driving part disposed on the side of the apparatus.

Referring to FIG. 1, a recording medium (or record bearing medium) to be used by an embodiment of this invention is arranged as described below:

A cassette 1 is arranged to carry the recording medium. A flexible rotary magnetic disc 2, which is employed as the recording medium, is disposed within the cassette 1. The magnetic disc 2 is provided with a center core 3 which serves as a mount part and is made of a synthetic resin. The core 3 is disposed in the middle part of the disc 2. To the lower surface of the center core 3 is secured a magnetizable plate 3d as shown in FIGS. 3B and 3C. A magnetic pin 3e is erected on the magnetizable plate 3d to pierce the center core 3. The cassette 1 is provided with upper and lower apertures 1a and 1b which are respectively arranged to permit insertion of stabilizing plates 37 and 15 for stabilizing the rotation of the magnetic disc 2 as shown in FIG. 2. A recording magnetic head 5 is arranged to enter through the lower aperture 1b and come either into contact with or close to the recording surface of the magnetic disc 2. The center core 3 is arranged to be mounted on a spindle 6 which is arranged on the side of the apparatus for driving the magnetic disc 2 to rotate. An engaging hole 3c is provided in the center core 3 for that purpose. The engaging hole 3c consists of slanting side face parts 3b and a spring part 3a. The spring part 3a is arranged to push the spindle 6 against the slanting side face parts 3b. A permanent magnet 7 is arranged at the flange part 6a of the spindle 6 in a position to correspond to the magnetizable plate 3d disposed on the lower surface of the center core 3. When the center core 3 is mounted on the spindle 6, the magnetizable plate 3d is attracted by the permanent magnet 7 causing a so-called magnetic "chucking" effected thereby. Then, the lower surface of the center core 3 comes to abut on the flange surface 6b of the flange part 6a of the spindle 6. By this, the height of the magnetic disc is defined relative to the head 5. The cassette 1 is provided further with upper and lower apertures 1c and 1d which are arranged for accommodating the center core 3.

An embodiment of this invention which uses the magnetic disc cassette mentioned above is arranged as follows:

Referring to FIG. 2, the recording apparatus which embodies this invention is provided with a body chassis 11. The spindle 6 and the head 5 are arranged on the chassis 11 to be rotatable and movable, respectively. A hinge shaft 12 is arranged on the chassis 11. A side plate 16, which is also disposed on the chassis 11, is provided with a shaft 17. On the shaft 17 is provided a clamp lever 18 which is under a clockwise urging force of a spring 19. A pair of pins 20 are erected on the side plate 16. Two slidable lock levers 21 and 23 are arranged to be guided by these pins 20 under leftward (as viewed is the drawing) urging forces of springs 22 and 24. Further, pins 41 and 42 are also erected on the side plate 16 and are arranged to engage the above-stated springs 22 and 24, respectively.

A cassette holder 31 is arranged to received the cassette 1. The holder 31 is pivotally mounted on the chassis 11 and is turnable relative to the chassis 11 on the hinge part 31e thereof. The holder 31 is provided with an aperture 31f which is arranged to receive the above-stated cassette 1. The cassette 1 is thus insertable through this aperture 31f. The holder 31 is also provided with other apertures 31a and 31b which are respectively arranged to permit stabilizing plates 37 and 15 to enter the holder 31 therethrough. The holder 31 is further provided with apertures 31c and 31d which are arranged to allow the spindle 6 and the protrudent part 38a of a leaf spring 38 for pushing the center core 3 to come into the holder 31.

A cassette loading-and-unloading detection lever 66 (see FIG. 5) is provided with a cassette sensing piece 66a. The sensing piece 66a is arranged to enter the holder 31 through a hole 11b in the chassis 11 and another aperture 31g provided in the lower side of the cassette holder 31. An outer cover 35 is pivotally mounted on the chassis 11 at its hinge part 35a and is turnable on the above-stated hinge shaft 12. Lock pins 36a and 36b are erected on the front side surface 35c of the outer cover 35. A hook member 40 is provided on the outer cover for the holder 31. An upper stabilizing plate 37 is attached to the ceiling part of the outer cover 35. A lower stabilizing plate 15 which is disposed on the chassis 11 is arranged to prevent, in conjunction with the upper stabilizing plate 37, vibration and deformation of the magnetic disc 2 from, taking place when it rotates by sandwiching the magnetic disc 2 between the stabilizing plates 37 and 15 from above and below. These stabilizing plates 37 and 15 are so arranged that a suitable layer of air is formed between the magnetic disc 2 and each of the plates 37 and 15. The head 5 is arranged to protrude through an aperture 15a provided in the middle part of the lower stabilizing plate 15. A T-shaped leaf spring 38 is arranged, by way of example, to have its tail end 38b secured to the ceiling part of the outer cover 35. A fore end part 38a of the leaf spring 38 is formed to protrude downward as shown in the drawing. Edge parts 38c on two sides of the leaf spring 38 are locked against the resilience of the leaf spring 38 by position restricting members 39 which are secured to the ceiling part of the outer cover 35. The protrudent part 38a of the leaf spring 38 is thus arranged to come to the upper part of the spindle 6 under an initial force developed with the edge parts 38c thus locked in position by the position restricting members 39. A spring 13, which is disposed on the hinge shaft 12, has its arm parts abutting on the holder 31 and the outer cover 35 and is thus arranged to impart turning forces to them in the direction of opening the cover 35. Another spring 14, which is also disposed on the hinge shaft 12, has its arm parts abutting on the chassis 11 and the outer cover 35. With the spring 14 arranged in this manner, a counterclockwise turning force is exerted on the outer cover 35.

Figure 3C:
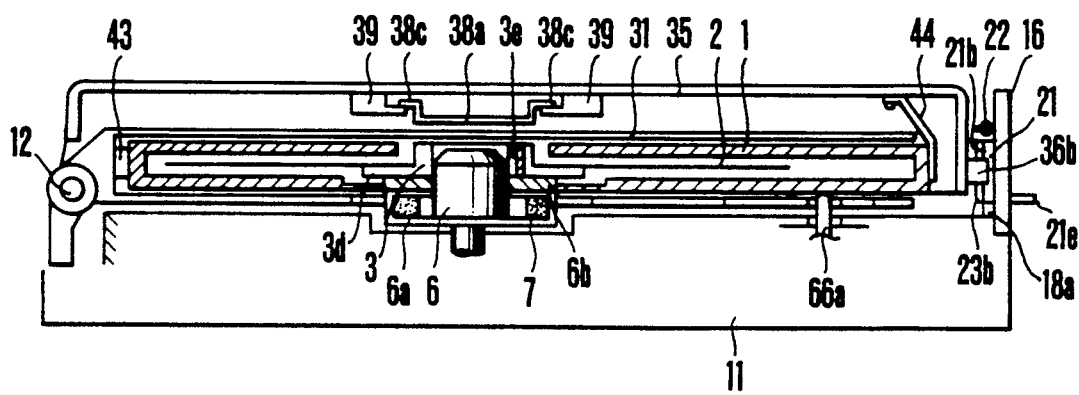
Figure 4A:
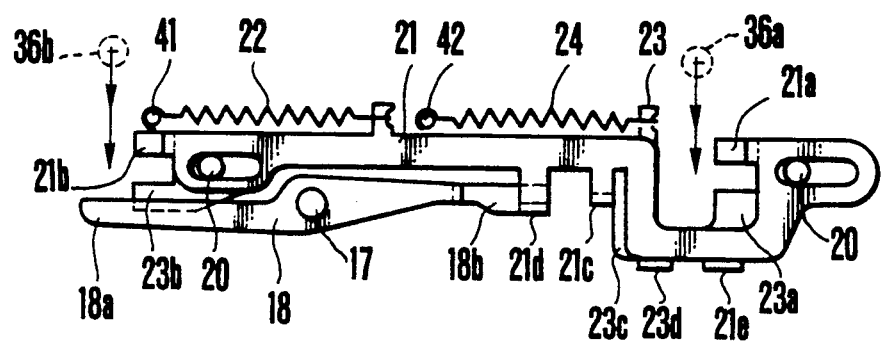
FIGS. 4A, 4B and 4C are plan views showing the details of the cover lock part of the arrangement of FIG. 2 as in its different conditions.
Figure 4B:
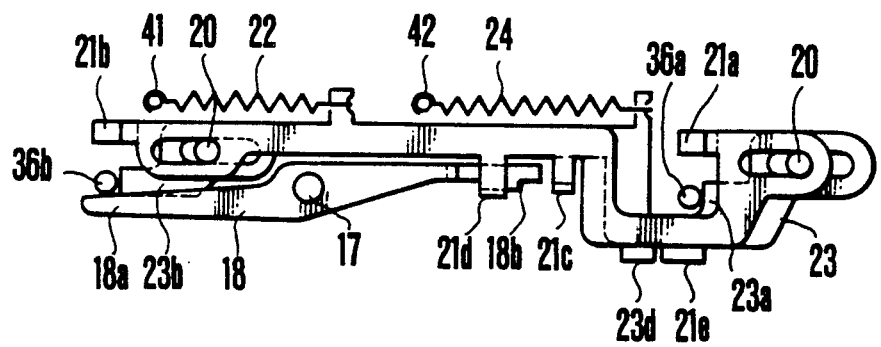
Figure 4C:
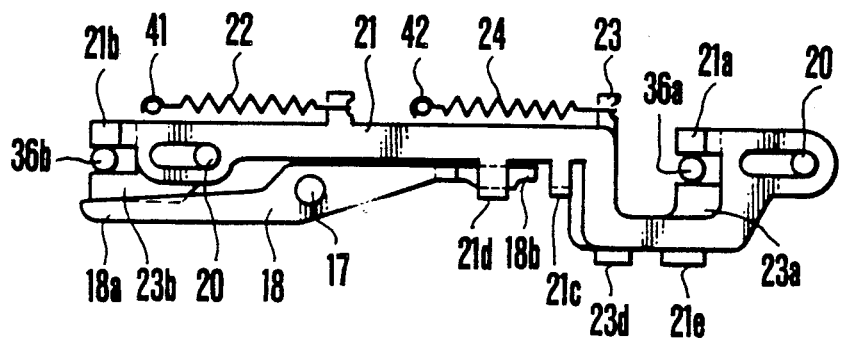

A normally open type outer cover lock completion detecting switch 74 is provided on the chassis 11. Under a condition as shown in FIGS. 3C and 4C, one contact piece 74a of the switch 74 is pushed by the switch control arm 23d of a lock lever 23 and is thus brought into contact with another contact piece 74b of the switch 74.

Figure 5:
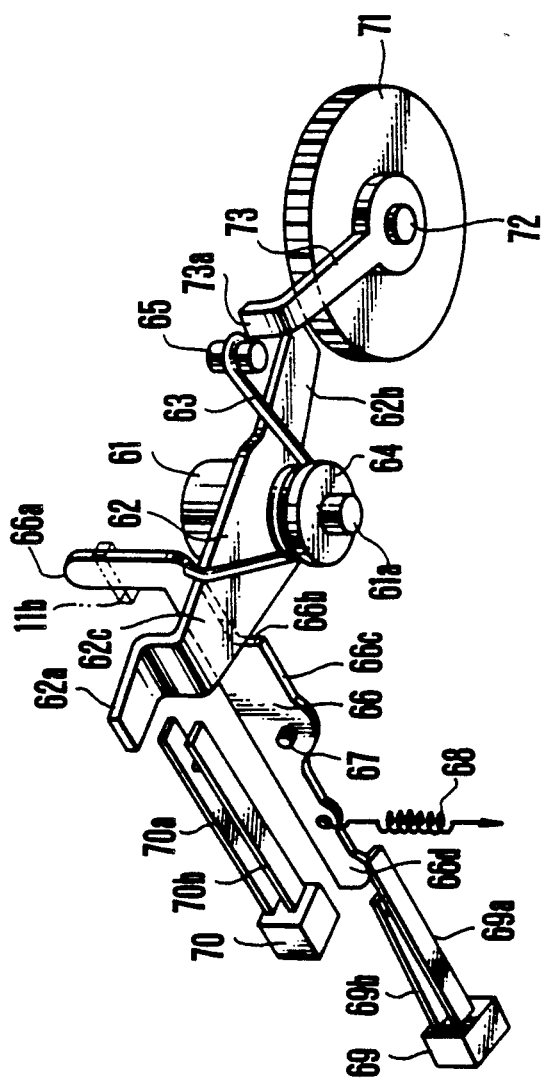
FIG. 5 is an oblique view of the embodiment of this invention showing obliquely from below a device employed in the embodiment of this invention for detecting and memorizing the replacement (loading and unloading) of a cassette.

Referring to FIG. 5, memory means which is arranged according to this invention to mechanically memorize an occurrence of the replacement (loading and unloading) of the cassette 1 is arranged as follows: A lever-pivotally-carrying member 61 is secured to the reverse side of the ceiling plate of the body chassis 11. A switch operating lever 62 is pivotally carried by the shaft part 61a of the member 61 and is arranged to be turnable and rockable on the shaft 61a. The lever 62 is provided with a switch operating part 62a which is formed with the fore end part of the lever bent upward to have the part 62a located above the contact piece 70a of a switch 70 in its neutral position. A spring 63 is arranged to urge the lever 62 to turn counterclockwise as viewed in the drawing and to keep the lever 62 in its neutral position. The spring 63 is wound round the shaft part 61a of the privotally carrying member 61 and has its two ends attached to the lever 62 and a fixed pin 65. The pin 65 is arranged such that, with the tail end 62b of the lever 62 received by the pin 65, the counterclockwise turn of the lever is limited to a point at which the switch operating part 62a comes to be just above the contact piece 70a of the switch 70. A member 64 is arranged to prevent the spring 63 and the lever 61 from pulling out of their positions.

A cassette loading-and-unloading detection lever 66, which is in an L-shape, is provided with a cassette sensing piece 66a at the fore end thereof. The lever 66 is pivotally carried by a shaft 67 to be turnable thereon. A spring 68 is arranged to urge the lever 66 to turn in the direction of having the cassette sensing piece 66a come to protrude toward the holder 31 via the hole 11b of the ceiling plate of the chassis 11. The lever 66 is further provided with a bent down part 66b which is arranged to receive the arm part 62c of the switch operating lever 62; a pushing down part 66c for pushing down the arm part 62c; and a switch operating part 66d which is arranged to push down the contact piece 69a of a switch 69.

The switch 69 is of the normally closed type and is arranged to detect the presence or absence of the cassette. In case that the apparatus is not loaded with the cassette 1, the cassette loading-and-unloading detection lever 66 is turned counterclockwise by the force of the spring 68. Then, the switch operating part 66d of the lever 66 pushes the contact piece 69a of the switch 69 to move it away from the other contact piece 69b of the switch. This causes the switch to turn off. When the apparatus is in a state of being loaded with the cassette 1, the sensing piece 66a of the lever 66 is pushed by the lower surface of the cassette 1 to turn clockwise. This brings the contact pieces 69a and 69b into contact with each other by virtue of the force of inertia and thus causes the switch 69 to turn on.

A cassette loading-and-unloading detection switch 70 which is of the normally open type is arranged to turn on when the switch operating part 62a of the switch operating lever 62 pushes down the contact piece 70a of the switch 70 to bring it into contact with the other contact piece 70b of the switch. A gear 71 is arranged to rotate in relation to a shift of the head 5 caused by a head shifting device which will be described later. The gear 71 is rotatably carried by a shaft 72. A reset lever 73 is formed in one unified body with the gear 71. When the head 5 is shifted by the head shifting device to a point located outside of a given recording area on the magnetic disc 2 (whatever the location may be, in the inner part or outer part of the disc 2), the bent up part 73a of the reset lever 73 pushes the tail end 62b of the switch operation lever 62 to move clockwise against the force of the spring 63. This causes the arm part 62c of the lever 62 to move away from the pushing-down part 66c of the cassette loading-and-unloading detection lever 66.

Figure 3A:
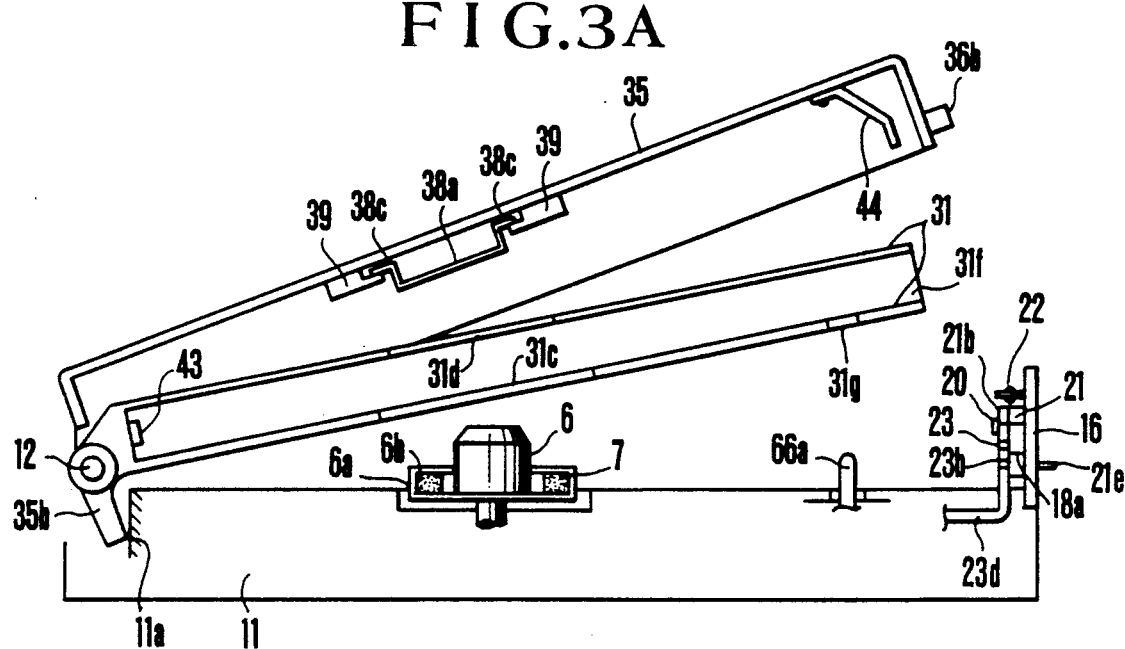
FIGS. 3A, 3B and 3C are sectional views taken along the line A—A of FIG. 2 showing the arrangement of the same embodiment as in different conditions.
Figure 3B:
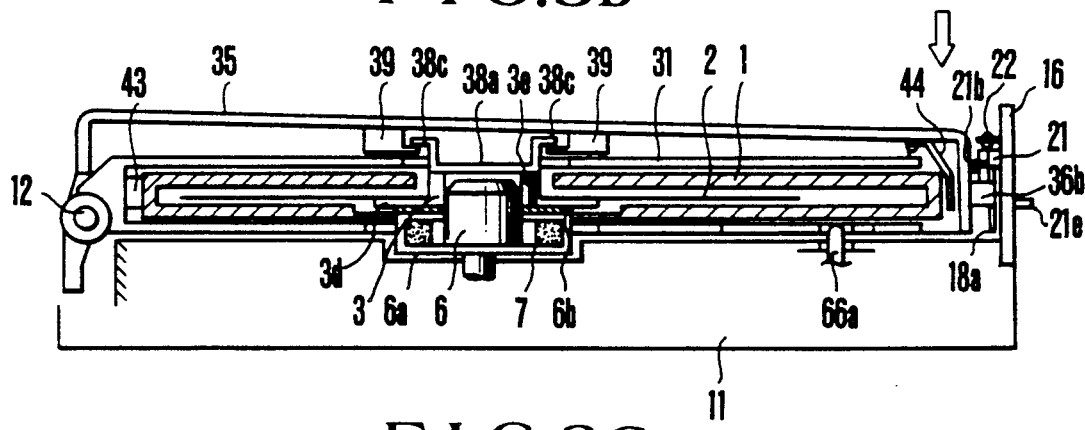

With the embodiment arranged as described above, in loading the apparatus with the cassette, the outer cover 35 is turned counterclockwise relative to the chassis 11 on the hinge shaft 12 against the urging force of the spring 14 as shown in FIG. 3A until one end 35b of the outer cover 35 comes to abut on a chassis wall 11a. In this instance, the urging force of the spring 13 tries to turn the holder 31 clockwise relative to the outer cover 35. However, the hook member 40, which is provided on the outer cover 35, serves to retain the holder 31 in the position as shown in FIG. 3A. Under this condition, the outer cover 35 and the holder 31 are in an open state as shown in FIG. 3A. Referring to FIG. 4A, under this opened condition, the hook part 18b of the clamp lever 18 and the claw part 21d of the lock lever 21 are in a state of engaging each other. The bent part 21c of the lock lever 21 is abutting on one end 23c of the lock lever 23. Accordingly, the two lock levers 21 and 23 are locked in a state of having been shifted to the right against the forces of the springs 22 and 24, respectively. Meanwhile, claw parts 21a and 23a and other claw parts 21b and 23b of these lock levers 21 and 23 are located outside of the moving loci of lock pins 36a and 36b provided on the outer cover 35. Further, under this condition, the contact pieces 74a and 74b of the lock completion detecting switch 74 are out of contact with each other.

Further, referring again to FIG. 5, the cassette loading-and-unloading detection lever 66 is, under this condition, in a state of having been turned counterclockwise by the force of the spring 68. Therefore, the switch operating lever 62 is released from the restriction imposed by the bent down part 66b of the detection lever 66. This allows the spring 63 to turn the lever 62 counter-clockwise until the tail 62b of the lever comes to impinge on the pin 65. The switch operating lever 62 is thus brought into a state in which the switch operating part 62a thereof is located exactly above the contact piece 70a of the cassette loading-and-unloading detection switch 70. Meanwhile, the cassette presence-or-absence detection switch 69 has its contact pieces 69a and 69b out of contact with each other with the contact piece 69a having been pushed down by the switch operating part 66d of the detection lever 66.

Again referring to FIG. 3A, when the cassette 1 is inserted into the holder 31 via the aperture 31f under the condition shown and the outer cover 35 is turned clockwise on the hinge shaft 12 against the urging force of the spring 14, the holder 31 also turns in the same direction on the hinge shaft 12. Under a cassette and disc loading completed condition as shown in FIG. 3C, the spindle 6 comes into the engaging hole 3c of the center core 3 of the magnetic disc 2 via the aperture 31c of the holder 31. The lower stabilizing place 15 and the upper stabilizing plate 37 also respectively come into the apertures 1b and 1a via the apertures 31b and 31a of the holder 31. Then, under that condition, when the outer cover 35 is pushed in further in the direction of arrow as shown in FIG. 3B from the cassette-and-disc loading completed position which is as shown in FIG. 3C, the protrudent fore end part 38a of the leaf spring 38 which is provided on the outer cover 35 urges the center core 3 of the magnetic disc 2 to move toward the spindle 6. The lower surface of the center core 3 thus comes to abut on the flange surface 6b of the flange part 6a of the spindle 6. In this instance, any quantitative difference between the pushing stroke on the outer cover 35 and a necessary extent to which the center core 3 is to be pushed in is absorbed by the flexure of the leaf spring 38.

With the cassette 1 having been inserted into the holder 31, under the condition shown in FIGS. 3B and 3C, the cassette sensing piece 66a of the cassette loading-and-unloading detection lever 66 is under the pressure of the lower surface of the cassette 1. This causes the lever 66 to be moved clockwise against the force of the spring 68. Then, the pushing-down part 66c of the lever 66 pushes the arm part 62c of the switch operating lever 62. In response to this, the switch operation part 62a of the operating lever 62 pushes the contact piece 70a of the cassette loading-and-unloading detection switch 70. The contact piece 70a is thus brought into contact with the contact piece 70b. The switch 70 turns on. Further, the cassette presence-or-absence detection switch 69 is then released from the pushing operation of the switch operation part 66d of the detection lever 66 on its contact piece 69a. Therefore, the switch 69 turns on by virtue of its own force of inertia.

In case that the cassette 1 is not inserted into the holder 31, the detection lever 66 is not turned clockwise. Therefore, both the switches 69 and 70 remain off.

As will be understood from the foregoing description, in the case of this embodiment, removal of the cassette 1 is memorized by the shift of the position of the switch operating lever 62 which takes place when the arm part 62c of the lever 62 turns round until it comes beneath the pushing-down part 66c of the cassette loading-and-unloading detection lever 66. Then, a memory signal representing the cassette removal is obtained in the form of turning on of the cassette loading-and-unloading detection switch 70 which takes place when the holder 31 is loaded with the cassette 1 and is pushed down in that state together with the outer cover 35 to obtain the condition of FIGS. 3B and 3C.

When the outer cover 35 is pushed in as shown in FIG. 3B, the pin 36b, which is erected on the outer cover 35 along with the lock pin 36a, comes to push the tail end 18a of the clamp lever 18. This causes the lever 18 to turn counterclockwise on the shaft 17 against the force of the spring 19. Accordingly, the hook part 18b of the lever 18 is disengaged from the claw part 21d of the lock lever 21. The disengagement allows the lock lever 21 to be moved leftward by the urging force of the spring 22 as shown in FIG. 4B. Then, the claw parts 21a and 21b of the lock lever 21 are respectively positioned above the lock pins 36a and 36b. Further, the side end part of the claw part 23a or 23b of the lock lever 23 then comes to abut sidewise on the lock pin 36a or 36b to prevent the lock lever 23 to be moved leftward by the force of the spring 24 while the other lock lever 21 is moving. After that, when the outer cover 35 is freed from the pushing-in operation, the urging force of the spring 14 tries to move the outer cover counterclockwise on the hinge shaft 12. However, this is blocked by the engagement of the lock pins 36a and 36b with the claw parts 21a and 21b of the lock lever 21. Further, the lock lever 23 is then caused by the urging force of the spring 24 to move to the left until its movement is restricted by the bent part 21c of the lock lever 21. The claw parts 23a and 23b then comes to engage the lock pins 36a and 36b as shown in FIG. 4C. At this point of time, the outer cover 35 is secured to the body chassis 11. Under this condition, the switch control arm 23d of the lock lever 23 brings the contact piece 74a to the lock completion detecting switch 74 into contact with the other contact piece 74b to turn on the switch. The fore end protrudent part 38a of the leaf spring 38 which is attached to the outer cover 35 comes out of contact with the center core 3. The magnetic disc 2 is thus adequately mounted on the spindle 6 and can be rotated in this state by the rotation of the spindle 6.

In taking out the cassette 1, the bent part 21e of the lock lever 21 which is protruding from a slot-like aperture 16a provided in the side plate 16 is pushed to the right as viewed on FIG. 4C against the forces of the springs 22 and 24. This causes the lock lever 21 to be locked by the clamp lever 18 as shown in FIG. 4A. The lock lever 23 is thus allowed to come back to its original position to open the switch 74. The springs 13 and 14 then act to bring the outer cover 35 and the holder 31 into a state as shown in FIG. 3A.

In FIGS. 3A, 3B and 3C, a reference numeral 43 denotes a positioning member for cassette 1. The member 43 is disposed inside the holder 31 at the bottom thereof. The ceiling part of the outer cover 35 is preferably provided with some suitable means such as a leaf spring 44 or the like which is arranged to push the cassette 1 against the positioning member 43 in response to the closing action of the outer cover 35 in such a manner as to ensure that the cassette 1 is accurately positioned.

In a modification example of the cassette and disc loading arrangement described above, the holder 31 is omitted. In place of the holder 31, a frame of a shape suited to the shape of the cassette 1 is formed as a fixed cassette receiving part within a space in between the hinge shaft 12 of the chassis 11 and the side plate 16 in such a manner as to have the cassette 1 inserted therein. In this instance, the ceiling part of the outer cover 35 is provided preferably with some suitable elastic member such as a leaf spring, a sponge member or a soft rubber member which is arranged to push the cassette 1 against the chassis 11 while the outer cover 35 is in a locked state in such a way as to keep it immovable. Further, in this instance, the apparatus is preferably provided with some suitable eject means which is either manually operatable or is arranged to operate in response to the opening move of the outer cover 35 to eject the cassette 1 from the receiving part of the chassis 11.

Further, in a possible modification of the memory means shown in FIG. 5, only the switches 69 and 70 and the gear 71 are disposed on the side of the body chassis. The operating lever 62 and the detection lever 66 are disposed on the reverse side of the holder 31 while they are arranged in the same manner as in the case of FIG. 5. The cassette sensing piece 66a of the detection lever 66 is arranged to enter the holder 31 via the aperture 31g of the holder 31. The levers 66 and 62 are thus arranged to be operatable on the switches 69 and 70 when the holder 31 and the outer cover 35 are set in the states of FIGS. 3B and 3C. Meanwhile, the reset lever 73 is operatable on the lever 62 under that condition.

Figure 6:
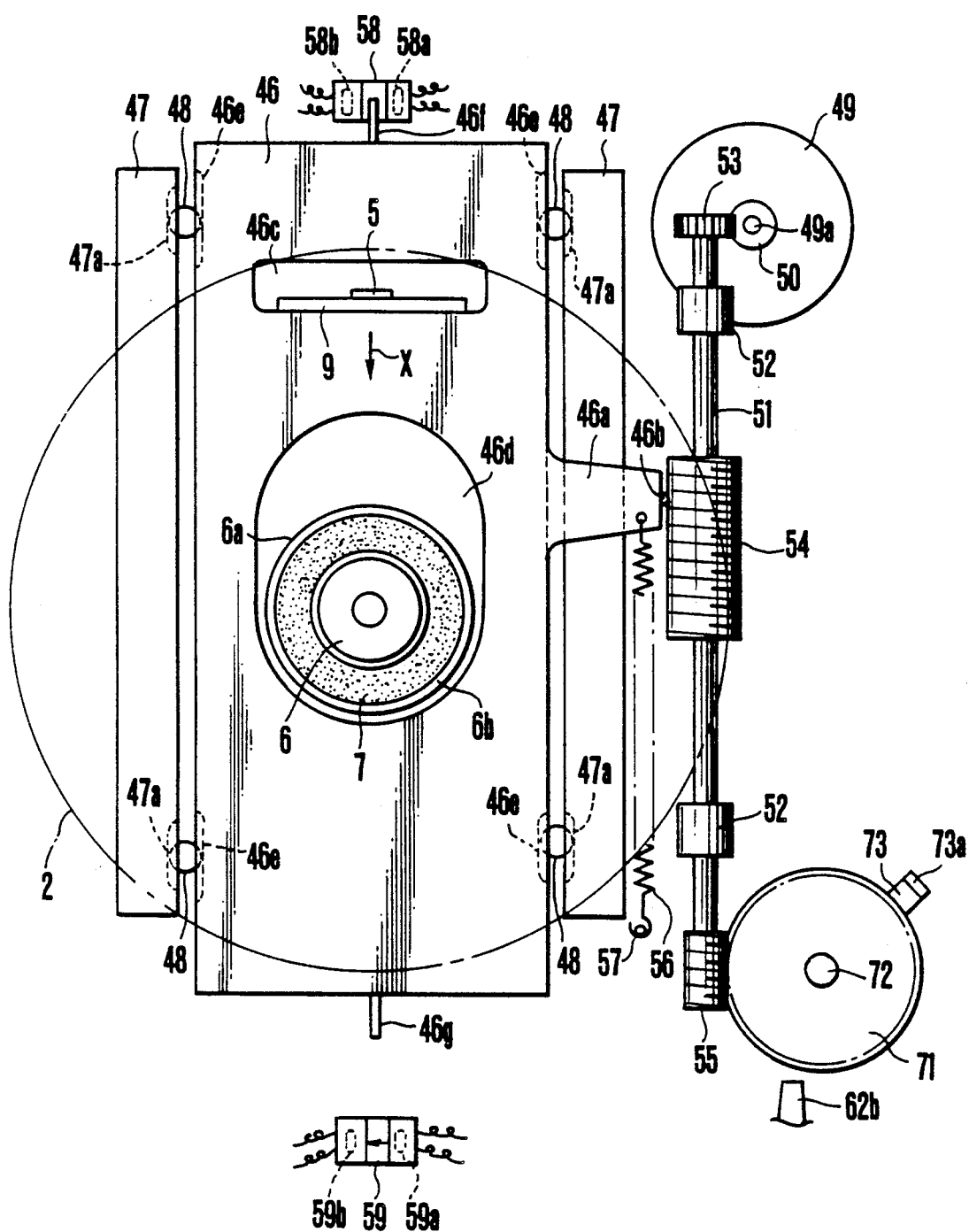
FIG. 6 is a plan view of the embodiment of this invention showing a head shifting device employed in the embodiment.

The details of the magnetic head shifting device are as shown in FIG. 6. The magnetic head 5 is secured to a slot part 46c of a head carrier 46 via a head mount base plate 9. The head carrier 46 is carried via sliding balls 48 by guide rails 47 and is slidable along the guide rails 47. The balls 48 are placed in V-shaped grooves 46e and 47a formed in the side parts of the head carrier 46 and in the guide rails 47. A slot 46d is formed in the head carrier 46 for the purpose of clearing the spindle 6. An engaging part 46b is arranged at the fore end of an arm part 46a of the head carrier 46 to engage a head shifting screw 54. A back-lash removing spring 56 is disposed in between the arm part 46a and a fixed pin 57. The spring 56 urges the head carrier 46 to move in the direction of arrow X, which is downward as viewed in drawing. This arrangement removes any back-lash of engagement between the engaging part 46b and the screw 54. The screw 54 is mounted on the middle part of a shaft 51. The shaft 51 is rotatably carried by a bearing 52. A worm wheel 53 and a worm gear 55 are mounted on opposite ends of the shaft 51. The worm wheel 53 engages a worm gear 50 which is mounted on the output shaft 49a of a stepper motor 49 for shifting the head 5. The worm gear 55 engages the gear 71 which is also shown in FIG. 5.

When the stepper motor 49 rotates, the rotation is transmitted via the engagement of the worm gear 50 and the worm wheel 53 to the shaft 51. The screw 54 is rotated by this. The head carrier 46 is then moved via the engagement of the engaging part 46b thereof and the screw 54 according to the lead of the screw 54. In this case, the moving direction of the carrier 46 is controllable by the rotating direction of the motor 49. The head shifting extent for a unit track pitch on the disc 2 is controllable by the number of rotation steps to be taken by the motor 49. In this case, the gear 71 is of course driven to rotate via the worm gear 55.

Detectors 58 and 59 are respectively arranged to detect deviation of the position of the head 5 from a given recording area on the disc 2 toward the outer side and the inner side of the disc. These detectors 58 and 59 are provided with light emitting elements 58a and 59a and light receiving elements 58b and 59b to form known photo-couplers. These photo-couplers are thus arranged to detect light shielding plates 46f and 46g which are attached to the carrier 46.

In the embodiment described, a total of 50 recording tracks can be formed in a predetermined recording area on the disc 2 at a predetermined track pitch, for example, 100 μm. It is assumed that these tracks are numbered 2 to 50 from the peripheral side toward the center of the disc 2. In this instance, the detector 58 is arranged to detect the light shielding plate 46f when the head 5 is shifted to a point located at a one-track pitch distance further toward the peripheral side of the disc 1 from the first track position (hereinafter expediently referred to as the No. 0 track position). Meanwhile, the other detector 59 is arranged to detect the light shielding plate 46g when the head 5 is shifted to a point located at a one-track pitch distance from the fiftieth track position further toward the middle of the disc (hereinafter expediently referred to as the 51st track position). The gear 71 is arranged to turn clockwise (counterclockwise in the case of FIG. 5) when the carrier 46 is moved in the direction of arrow X and to turn counterclockwise (clockwise in the case of FIG. 5) when the carrier 46 is moved in the direction reverse to the arrow X. With the gear 71 rotated, the bent-up part 73a of the reset lever 73 comes to push the tail end 62b of the switch operating lever 62 when, for example, the head 5 is shifted to an extent of five track pitches further toward the middle part of the disc from the 51st track position. Then, the arm part 62c of the lever 62 is disengaged from the pushing-down part 66c of the detection lever 66. Further, the head carrier 46 is arranged to be shifted in the direction of arrow X by the forward rotation of the stepper or stepping motor 49 and in the reverse direction by the reverse rotation of the motor 49.

Figure 7:
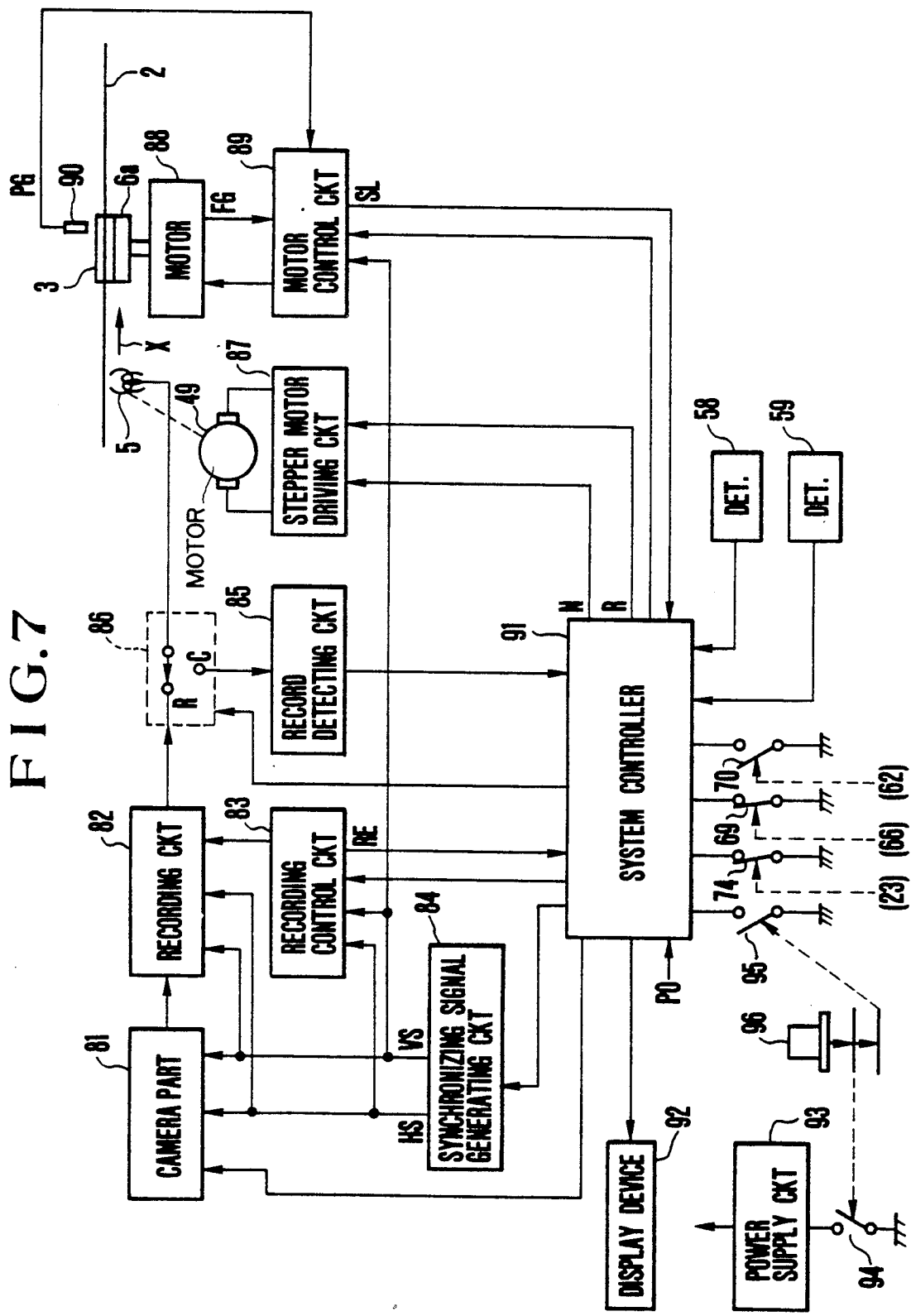
FIG. 7 is a block diagram showing the electric circuit arrangement of the of this invention.

While the mechanical arrangement of the recording apparatus according to this invention is as described in the foregoing, the electrical circuit arrangement of this embodiment is as follows: FIG. 7, shows by way of example, the circuit arrangement of a still video recording apparatus embodying this invention. A camera part 81 is arranged in a known manner to form a video signal. A recording circuit 82 is arranged to record the video signal coming from the camera part 81 on the disc 2 via the head 5. A recording control circuit 83 is arranged to cause the recording circuit 82 to record one field or one frame portion of the video signal. A synchronizing signal generating circuit 84 is arranged to generate horizontal and vertical synchronizing signals HS and VS. The output of the circuit 84 is arranged to be supplied to the camera part 81, the recording circuit 82, the recording control circuit 83 and a disc motor control circuit 89 which will be described later. Further, the recording control circuit 83 is arranged to produce a recording end signal RE upon completion of recording by the head 5.

A record detecting circuit 85 is arranged to detect, through the head 5, whether there is a record or no record of a video signal at each recording position on the disc 2. A change-over switch 86 is arranged to switch the connection with the head 5 between the output terminal of the recording circuit 82 (one terminal R of the switch) and the input terminal of the detecting circuit 85 (another terminal C of the switch).

A stepper motor driving circuit 87 is arranged to drive the stepper motor 49 which is used for shifting the head as shown in FIG. 6. A motor 88 is arranged to cause the disc 2 to rotate via the spindle 6. A disc motor control circuit 89 is arranged to control the disc rotating motor 88 and includes therein a reference oscillator which produces a reference speed signal. The circuit 89 controls the motor 88 on the basis of the reference speed signal, a rotation speed signal FG obtained from the motor 88, the vertical synchronizing signal VS from the synchronizing signal generating circuit 84 and a disc rotation phase signal PG from a disc rotation phase detector 90 which detect the magnetic pin 3e buried in the center core 3. The motor 88 is thus controlled to rotate the disc 2 at a predetermined speed corresponding either to the field or frame frequency of television, i.e. at 3,600 or 1,800 rpm in the case of the NTSC system, and at a predetermined phase relative to the timing of the vertical synchronizing signal VS. Further, the control circuit 89 produces a servo-lock-in signal SL when the motor 88 comes to rotate both at the predetermined speed and at the predetermined phase.

A system controller 91 is arranged to control the whole circuit arrangement of FIG. 7 according to the output of a recording trigger switch 95; that of the above-stated cassette presence-or-absence detection switch 69; that of the cassette loading-and-unloading detection switch 70; that of the outer cover lock completion detecting switch 74; those of the carrier position detectors 58 and 59; the recording end signal RE from the recording control circuit 83; the servo-lock-in signal SL; and a power-on signal PO which is obtained when the power supply is switched on.

A display device 92 includes either light emitting or sound producing elements. A power supply circuit 93 includes a battery. The circuit arrangement includes a power supply switch 94; a recording trigger switch 95; and a trigger button 96. In this specific embodiment, the trigger button 96 is arranged to cause the power supply switch to turn on when the button is pushed down to a first step and to cause the recording trigger switch 95 to turn on when it is pushed further down to a second step.

Further, it goes without saying that the trigger button 96 may be arranged to be used only for operating the trigger switch 95 while the power supply switch 94 is arranged to be operated by some other member.

In case that the recorded signal is an FM signal, the record (presence-or-absence) detecting circuit 85 is arranged to detect the presence or absence of a radio frequency (RF) signal and to produce a high level signal in the event of the presence of the signal.

Figure 8:
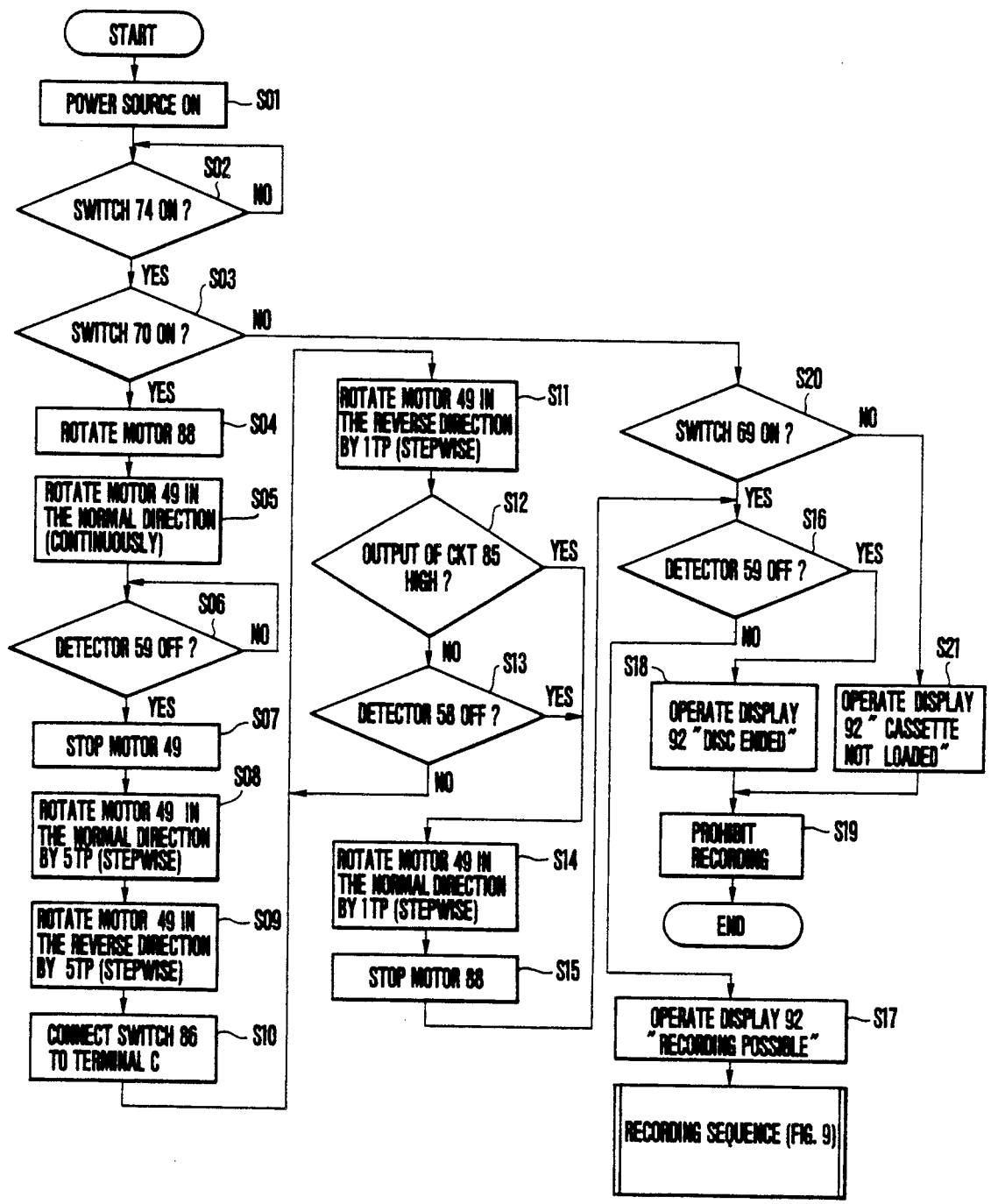
FIG. 8 is a flow chart showing the control operation of a system controller of FIG. 7 to be performed in preparation for recording.

The system controller 91 is principally composed of a micro-computer, etc. The operation of the system controller 91 is as described below with reference to flow charts:

Referring to FIG. 8, with the trigger button 96 pushed down to its first step to turn on the power supply switch 94, an operation to make preparations for recording is performed as shown in FIG. 8. With the power supply switched on (at step S01), the system controller 91 checks the outer cover lock completion detecting switch 74 to find whether it is on (at a step S02). If it is found not on as yet, the controller waits until it turns on. If it is found on, the controller 91 checks the cassette loading-and-unloading detection switch 70 to find whether it is on (at a step S03). If this switch 70 is found on, it indicates that the cassette 1 has been replaced (loaded and unloaded). In this case, an automatic positioning operation is performed on the head 5 to bring it to an unrecorded part on the disc 2.

If the head 5 is shifted while the disc 2 is in repose, the recording surface of the disc 2 would be damaged. To prevent this, the controller 91 instructs the disc motor control circuit 89 to start the motor 88. The motor 88 is thus caused to rotate (at a step S04). Following that, the stepper motor driving circuit 87 is instructed to cause the stepper motor 49 to continuously rotate forward.

The motor 49 comes to continuously rotate forward (at a step S05). As a result of this, the head 5 is continuously shifted toward the middle part of the disc 2, i.e. in the direction of arrow X as shown in FIG. 7. During this process, the controller 91 checks, in a repeating manner, the condition of the carrier position detector 59 to find whether its light receiving element 59b is turned off by the light shielding plate 46g of the carrier 46 (see FIG. 6) as a result of arrival of the head 5 at the 51st track position (at step S06). When the light receiving element 59b of the detector 59 turns off, the controller instructs to the motor 49 to stop (step S07). Immediately after that, the controller 91 instructs the driving circuit 87 to have the motor 49 make stepwise forward rotation to shift the head 5 further in the direction of arrow X to an extent corresponding to five track pitches (hereinafter will be called TP's for short) (step S08). In response to this, the reset lever 73 of FIG. 5 causes the switch operating lever 62 to turn clockwise as viewed on FIG. 5. The arm part 62c of the lever 62 then disengages from the pushing-down part 66c of the cassette loading-and-unloading detection lever 66. This brings the cassette loading-and-unloading detection switch 70 back to its OFF state. Meanwhile, the spring 63 acts on the switch operating lever 62 to bring it back to its neutral state in which its arm part 62c can abut on the bent-down part 66b of the detection lever 66. After that, therefore, the operating lever 62 abuts on the bent-down part 66b of the detection lever 66 even it is freed from the pressure of the reset lever 73 and thus does not act on the switch 70.

After the stepper motor 49 is caused to make stepwise forward rotation to an extent corresponding to 5 TP's, the controller 91 instructs the driving circuit 87 to have the motor 49 make stepwise reverse rotation to shift the head 5 to the extent of 5 TP's in the direction reverse to the direction of arrow X (step S09). As a result, the head 5 is positioned at the 51st track on the disc 2.

Following this, the controller 91 connects the change-over switch 86 to its terminal C (step S10). Under that condition, the controller instructs the driving circuit 87 to have the motor 49 make stepwise reverse rotation to shift the head 5 to an extent corresponding to 1 TP in the direction reverse to the arrow X (step S11). The head 5 is thus positioned at the 50th track on the disc 2. Under this condition, the record detecting circuit 85 is connected via the change-over switch 86 to the head 5. The detecting circuit 85, therefore, detects whether there exists any signal previously recorded in the 50th track on the disc 2 according to a signal picked up by the head 5. In the event of the presence of any recorded signal there, the circuit 85 produces a high level signal. If no signal is detected there, it produces a low level signal. The controller 91 checks the output of the detecting circuit 85 to find whether it is at a high level (step S12). If it is not at a high level, the controller checks the carrier position detector 58 to find whether the light receiving element 58b thereof has been turned off (step S13). If not, the operation of the controller 91 comes back to the step S11 to instruct again to have the motor 49 make a stepwise reverse rotation in the direction reverse to the arrow X to shift the head 5 to an extent corresponding to 1 TP. In this manner, the processes of the steps S11, S12 and S13 are repeated until either the output level of the detector 85 becomes high or the element 58b of the detector 58 turns off. When either the output level of the detection circuit 85 becomes high or the element 58b turns off, the controller 91 instructs the motor 49 to make a stepwise forward rotation to shift the head 5 to the extent of 1 TP (step S14), because: The change of the output level of the detection circuit 85 to a high level indicates that the head 5 has reached the last of recorded tracks with these tracks counted in the sequence of the recording track numbers on the disc 2. Accordingly, when the operation of the controller 91 comes to the step S14, the head 5 is positioned at an unrecorded track position located next to the last recorded track. (In other words, in this particular instance, some of the recording tracks on the disc 2 have already been recorded.) Meanwhile, turning off of the element 58b of the detector 58 indicates arrival of the head 5 at the No. 0 track position on the disc 2. Therefore, in this instance, with the operation coming from the step S13 to the step S14, the head 5 is set at the first track position, that is, this indicates that the disc 2 has not been recorded.

With the head 5 thus having been set at an unrecorded track position immediately following the last recorded track, the controller 91 issues an instruction for bringing the disc motor 88 to a stop (at a step S15). The controller 91 then checks the detector 59 to see if it is in an OFF state (at a step S16). If not, the display device 92 is caused to make a display indicating that recording can be performed (or indicating completion of preparations for recording), at a step S17. In the event of the OFF state of the detector 59, the controller 91 has the display device 92 make a display indicating completion of recording in all the recording positions on the disc 2 (at a step S18). Recording is inhibited (at a step S19).

At the preceding step S03, if the cassette loading-and-unloading switch 70 is found not ON, it indicates either that the cassette 1 has not been replaced or that the recording apparatus is not loaded with the cassette 1. Such being the case, the controller 91 checks if the cassette (presence-or-absence) detection switch 69 is ON (step S20). In the event that the switch 69 is on indicating that the cassette 1 has not been replaced, the operation of the controller 91 shifts to the previously described step S16. In case that the switch 69 is found not ON thus indicating that the apparatus is not loaded with the cassette 1 (absence of the cassette), the controller 91 has the display device 92 make a display indicating this (at a step S21) and inhibits recording (step S19).

This embodiment thus makes preparations for recording in the manner as described above.

Figure 9:
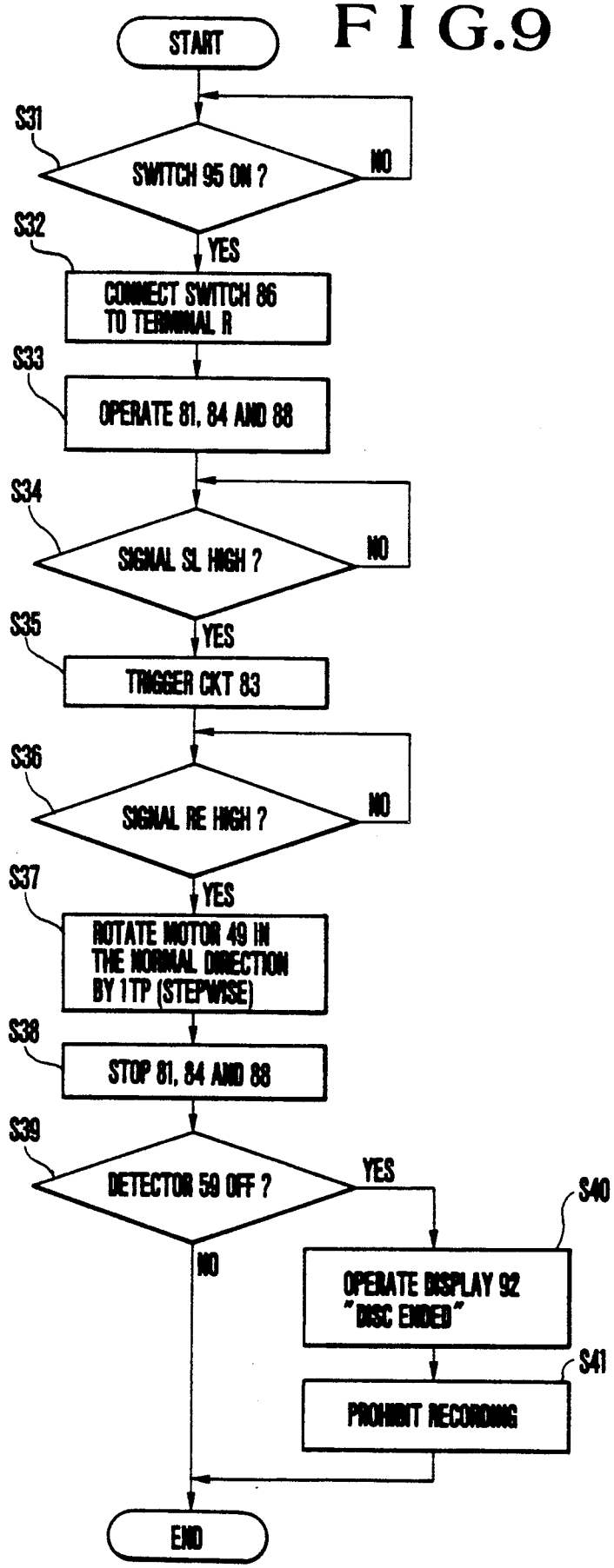
FIG. 9 is a flow chart showing the control operation of the same system controller to be performed in carrying out a recording operation.

Referring now to FIG. 9, after completion of the preparations for recording, a recording operation on a video signal is initiated by turning on the recording trigger switch 95 and is performed in the following manner: As long as the power supply is not switched off after completion of the preparations for recording, the system controller 91 checks, in a repeating manner, the recording trigger switch 95 to see if it has been turned on by a depressing operation on the trigger button 6 down to its second step (at a step S31). When the trigger switch 95 is turned on, the controller 91 shifts the connecting position of the change-over switch 86 to the terminal R thereof (at a step S32). Following this, the camera part 81 and the synchronizing signal generating circuit 84 are actuated. At the same time, the motor control circuit 89 is instructed to rotate the disc motor 88 (at a step S33). As a result, the camera part 81 produces a video signal in synchronism with the synchronizing signals HS and VS coming from the synchronizing signal generating circuit 84. The recording circuit 82 then processes the video signal obtained from the camera part 81 by performing frequency modulation, etc. to change it into a recording signal. Under this condition, a recording gate which is included in the recording circuit 82 is in an OFF state. Therefore, although the recording circuit 82 is connected via the change-over switch 86 to the head 5, no recording is performed under this condition. Meanwhile, the motor control circuit 89 controls the rotation of the motor 88 to have the disc 2 rotated at a speed corresponding to the field or frame frequency and at a phase in a predetermined relation to the vertical synchronizing signal VS. This control is performed on the basis of the speed signal FG from the motor 88, the rotation phase signal PG from the rotation phase detector 90 and the vertical synchronizing signal VS from the circuit 84. When the motor 88 comes to rotate at the controlled speed and at the controlled phase, the level of the servo-lock-in signal SL becomes high. Meanwhile, the controller 91 produces an instruction to operate the motor 88. After that, it repeats checking the servo-lock-in signal SL which comes from the control circuit 89 to see if the level of the signal has become high (at a step S34). When the level of the servo-lock-in signal SL becomes high, the recording control circuit 83 is immediately triggered for recording (at a step S35). Upon receipt of the recording trigger signal, the circuit 83 causes, on the basis of the synchronizing signals HS and VS from the synchronizing signal generating circuit 84, the recording gate of the recording circuit 82 to turn on for either one field or one frame period including the vertical synchronizing signal VS first received immediately after receipt of the recording trigger signal. As a result, a one-field or one-frame portion of a recording signal is supplied via the change-over switch 86 to the head 5. The recording signal is then recorded on the disc 2 while the disc 2 is caused by the motor 88 to make just one turn. In that instance, the vertical synchronizing signal VS is of course recorded at a predetermined rotation point relative to the magnetic pin 3e of the center core 3. Upon completion of recording the one-field or one-frame portion of the recording signal performed in this manner, the recording control circuit 83 changes the level of the recording end signal RE to a high level. Meanwhile, after the recording triggering action, the controller 91 has been repeatedly checking the recording end signal RE to see whether the level of this signal has become high (step S36). When the level of the signal RE becomes high, the controller instructs the motor driving circuit 87 to cause the stepper motor 49 to make stepwise forward rotation to shift the head 5 to a next recording position, that is, to shift it to the extent of 1 TP in the direction of arrow X (step S37). Following this, the controller 91 stops the camera part 81 and the synchronizing signal generating circuit 84 from operating. The controller also instructs the motor control circuit 89 to bring the rotation of the disc motor 88 to a stop (step S38) After this, the controller 91 checks the detector 59 for its OFF state resulting from the shift of the head 5 (step S39). Upon detection of the OFF state, the controller 91 causes the display device 92 to indicate completion of recording on the disc (step S40) and inhibit further recording thereon (step S41).

In case that further recording is not inhibited, the above-stated processes are repeated every time the trigger switch 95 turns on to have one field or one frame portion of the signal recorded in each of the tracks on the disc 2 one after another.

Modification example: While an embodiment of this invention is arranged as described in the foregoing, a modification of the embodiment is arranged, by way of example, as follows: In the preceding example, the switch operating lever 62 is reset, i.e. the recording means is reset, when the head 5 is to be shifted from the 51st track position to an extent of 5 TP's closer to the center of the disc 2. After that, the head 5 is set at an unrecorded track position which is first found unrecorded by a checking operation performed on the recording tracks one after another in the reverse sequence of the track numbers (in the direction reverse to the arrow X of FIG. 7) for finding the presence or absence of a previous record. In the case of this modification example, however, the operating lever 62 is reset when the head 5 is to be shifted from the No. 0 track position to a predetermined extent further toward the periphery of the disc 2. After that, the head 5 is set at a first unrecorded track position found by a checking operation performed for finding the presence or absence of previous record in the sequence of the track numbers (or in the direction of arrow X of FIG. 7, instead of the direction reverse to the arrow X).

For this modification, the arrangement of FIG. 6 is changed as follows: The gear 71 is arranged to be rotated clockwise by the movement of the carrier 46 in the direction reverse to the arrow X. Then, while the head 5 is being shifted from the No. 0 track position to the extent of 5 TP's, for example, in the direction reverse to the arrow X, the reset lever 73 pushes the tail end 62b of the operating lever 62 to cause the lever 62 to turn clockwise as viewed on FIG. 5.

Figure 10:
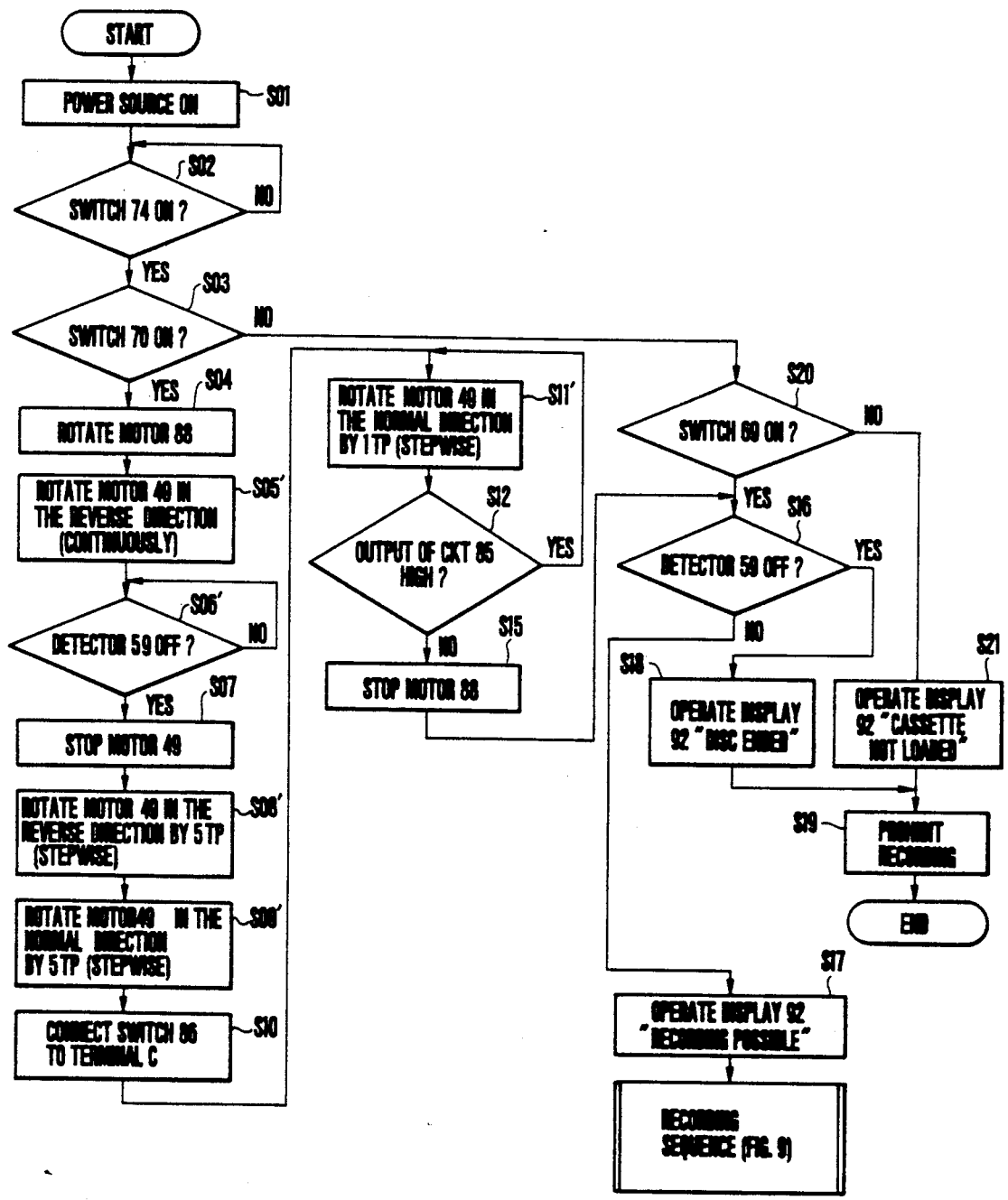
FIGS. 10 and 11 are flow charts respectively showing the control operation of a system controller performed in preparation for recording in two modifications of the embodiment of the invention mentioned above.

Further, in this instance, the control operation of the system controller of FIG. 7 to be performed in preparation for recording is changed as shown in the flow chart of FIG. 10. In FIG. 10, the same processes as those shown in FIG. 8 are indicated by the same step numbers. Meanwhile, processes which are not exactly the same as those shown in FIG. 8 but correspond to them are indicated by the same step numbers with an apostrophe affixed to each of them. The following description mainly covers the processes of the control operation of the system controller 91 which differ from those shown in FIG. 8. When the cassette loading-and-unloading detection switch 70 is found ON at the step S03, the controller 91 instructs the disc motor 88 to rotate (at the step S04). Following that, the controller instructs for continuous reverse rotation of the stepper motor 49 to shift the head 5 in the direction reverse to the arrow X (at a step S05'). In the meantime, the controller 91 repetitively checks the detector 58 to see if it has turned off (at a step S06'). When the detector 58 turns off, the controller instructs to bring the rotation of the motor 49 to a stop (step S07). By this step, the head 5 is set at the No. 0 track position. After this, the controller 91 instructs the stepper motor 49 to make stepwise reverse rotation to further shift the head 5 from the No. 0 track position to the extent of 5 TP's in the direction reverse to the arrow X (at a step S08'). By this, the operating lever 62 has its tail end 62b pushed by the bent-up part 73a of the reset lever 73 and is thus caused to turn round clockwise to be reset. Then, the controller 91 instructs the motor 49 to make stepwise forward rotation to shift the head 5 back to the No. 0 track position by moving it in the direction of arrow X (at a step S09'). Following that, the connecting position of the change-over switch 86 is shifted to the terminal C thereof (step S10). The controller 91 then instructs the motor 49 to make stepwise forward rotation to shift the head 5 in the direction of arrow X to the extent of 1 TP (step S11'). With the head 5 thus shifted to the new position (the first track position in this instance), the track is checked for presence or absence of any previous record. In other words, the controller 91 checks the output level of the detection circuit 85 to see if it is high (step S12). If it is found high, the operation comes back to the step S11'. After that, the same processes are repeated until the output level of the circuit 85 ceases to become high. Then, at that point of time, the controller instructs to bring the rotation of the disc motor 88 to a stop (step S15). The head 5 is thus set at an unrecorded track which is first found unrecorded by the record checking process performed on the recording tracks one after another in the sequence of the recording track numbers. With the exception of that, the rest of the operation including the recording control are performed in exactly the same manner as in the case of the preceding example of embodiment described in the foregoing.

Figure 11:
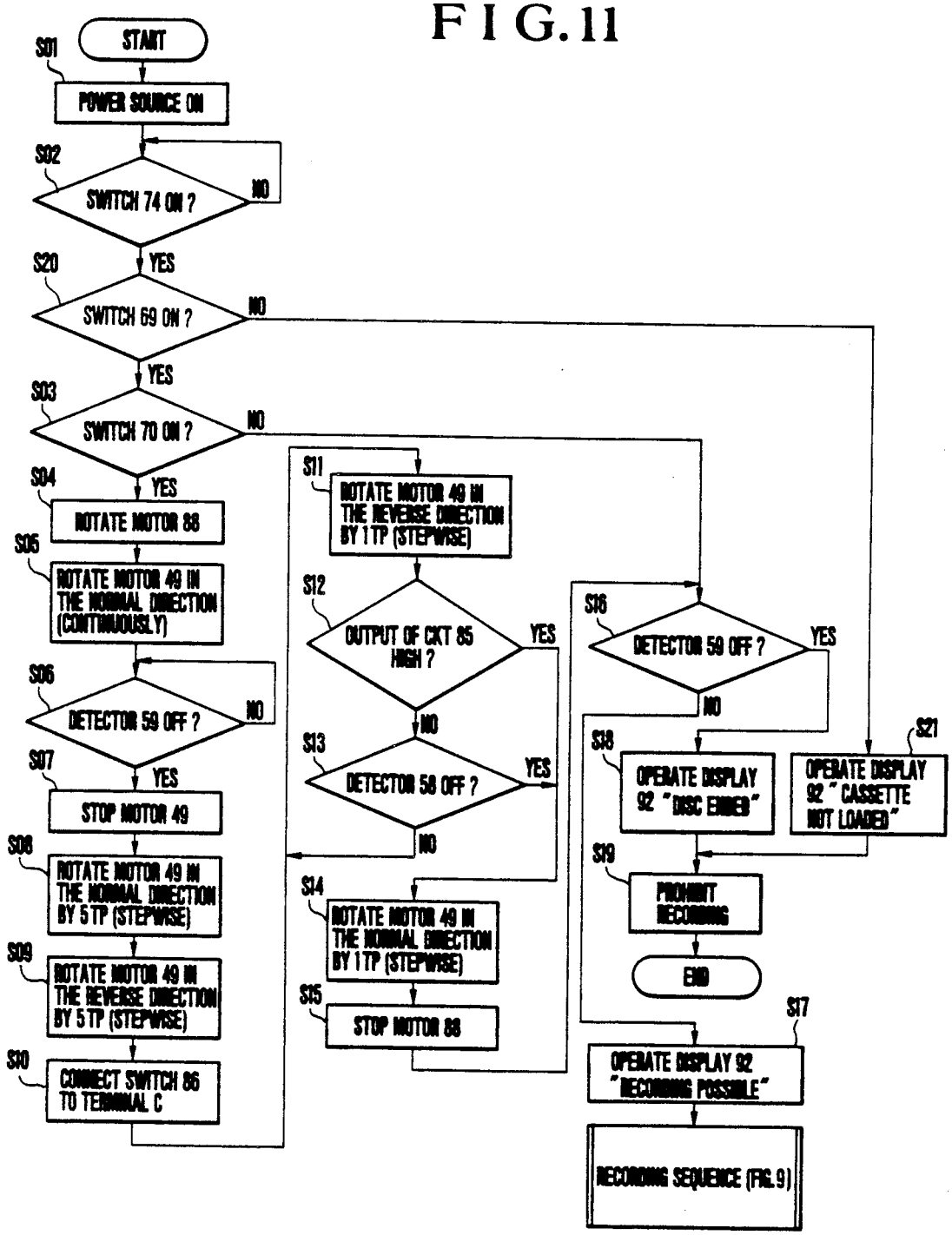

Further to the modification example mentioned in the foregoing, the memory means shown in FIG. 5 may be changed in the following manner as another modification example: The cassette loading-and-unloading detection lever 66 is arranged to detect the loading and unloading of the cassette 1 by detecting the opening action of the holder 31 or that of the outer cover 35 (the condition as shown in FIG. 3A) instead of detecting the presence of the cassette 1 within the holder 31. In the case of the former, the aperture 31g of the holder 31 is closed and the sensor piece 66a of the lever 66 may be arranged to detect the bottom surface of the holder 31. In the case of the latter, the sensor piece 66a may be arranged to detect the edge of the outer cover 35 or the hook 40 (see FIG. 2). However, in either case, the function of the cassette presence-or-absence detection switch 69 would be affected without some modification. Therefore, the switch 69 should be modified to be of a normally open type and to be operatable independently of the detection lever 66. A detection pin or the like is secured to the upper contact piece (corresponding to 69b) of the switch 69 and is arranged to be capable of entering the inside of the holder 31 through the ceiling plate of the chassis 11 and an opening provided in the lower side of the holder 31. With the holder 31 and the outer cover 35 closed, this pin is thus arranged to be pushed to bring the contact pieces (69b and 69a) of the switch 69 into contact with each other only when the cassette 1 is present within the holder 31. In this instance, the system controller 91 is arranged to perform its control operation in preparation for recording in a manner as shown in a flow chart in FIG. 11. The control operation shown in FIG. 11 only partly differs in the sequence of steps from the flow chart of FIG. 8 while the process of each step remains unchanged. More specifically, the checking action performed at the step S20 for finding the presence or absence of the cassette 1 when that the cassette loading-and-unloading switch 70 is found not ON at the step S03 of FIG. 8 is changed to be performed, in this instance, between the step S02 of checking for ON of the outer cover lock completion detecting switch 74 and the next step S03.

In a further modification example, the resetting action on the switch operating lever 62 is arranged to be performed independently of the shift of the head 5. More specifically, the arrangement of the gear 71 and the reset lever 73 of FIGS. 5 and 6 is replaced with a suction solenoid or a rod thrusting type plunger which is arranged close to the tail end 62b of the lever 62 to be energized by the controller 91, for example, in parallel with the step S04 or S15 of FIGS. 8, 10 and 11. In this case, the lever 62 is thus arranged to be caused to turn round clockwise as viewed on FIG. 5 by the suction of the solenoid or the thrusting force of the plunger rod.

In the embodiment and modifications thereof described, the recording tracks on the disc 2 are numbered in the sequence from the peripheral edge of the disc 22 to the central portion thereof. However, the numbering order may be reversed to make it from the central portion to the peripheral edge of the disc 2. In that event, the flow of the operation shown in FIGS. 8 to 11 is also somewhat modified accordingly.

In the foregoing, a still video recording apparatus of the kind having the camera part arranged in one unified body therewith is described by way of example. However, the camera part 81 may be separately arranged. In the embodiment, the battery is employed as the power source for the recording apparatus. The use of the battery may be replaced with a commercial power supply.

The apparatuses to which this invention is applicable are not limited to video signal recording apparatuses. This invention is applicable also to apparatuses of other kinds arranged to record audio signals or information such as data, etc. Further, the recording method to be employed is not limited to magnetic recording. The shape of the record bearing medium is not limited to a disc shape. The medium may be in a drum shape or a tape shape, such as the tape to be used for an 8-track audio recorder.

While the embodiment described is arranged to decide whether the set position of the head 5 must be readjusted or not on the basis of the stored information on whether or not the cassette 1 has been replaced, this may be replaced with some other arrangement. For example, the discrimination may be arranged to be made between necessity and unnecessity of readjustment of other setting conditions for recording, such as changing the head 5 according to the properties and kind of the disc 2, on the basis of information stored by the memory means.

What is claimed is:

1. A recording/reproducing apparatus comprising:
   a) loading and unloading means for loading or unloading a record bearing medium on or from said recording/reproducing apparatus for recording or reproduction;
   b) means for recording/reproducing information on/from the recording bearing medium;
   c) discriminating means for making a discrimination between a part of said record bearing medium which has already been recorded and a part thereof which has not been recorded as yet after said record bearing medium is loaded on the apparatus by said loading and unloading means;
   d) first memory means for storing information on a result of the discrimination made by said discriminating means;
   e) a power source arranged to drive at least said discriminating means and said first memory means; and
   f) second memory means for storing information on a state of the apparatus having said record bearing medium loaded or unloaded with the power supply from said power source has been disabled.

2. An apparatus according to claim 1, wherein said second memory means includes mechanical members.

3. An apparatus according to claim 1, wherein said discriminating means is arranged to detect the presence or absence of a signal within a recordable area on said record bearing medium.

4. A recording apparatus according to claim 1, wherein said medium is a disc-shaped medium.

5. A recording apparatus according to claim 4, wherein said disc-shaped recording medium has concentric tracks formed thereon.

6. A recording apparatus according to claim 1, wherein said medium is a magnetic recording medium.

7. A recording apparatus according to claim 1, wherein said medium is a medium for recording a video signal.

8. A recording apparatus according to claim 1, and further comprising display means for effecting display in response to said discriminating means.

9. A recording apparatus according to claim 8, wherein said display means is arranged to indicate a warning when a non-recorded area has been detected by said discriminating means.

10. A recording or reproducing apparatus comprising:
    a) means for recording or reproducing information on a record bearing medium;
    b) loading and unloading means for loading or unloading the record bearing medium on or from said recording or reproducing means for recording or reproduction;
    c) means for supplying power to at least a part of said recording or reproducing apparatus, said power supplying means including a power supply;
    d) discriminating means for making a discrimination between a part of said record bearing medium which has already been recorded and a part thereof which has not been recorded as yet after the power supply from said power supply means is enabled;
    e) first memory means for storing information regarding loading and unloading of said record bearing medium while said apparatus is in a state of having said power supply disabled; and
    f) means for changing an operation of said discriminating means according to the information stored at said memory means.

11. An apparatus according to claim 10, wherein said discriminating means includes:
    a) reproducing means for reproducing information from said record bearing medium; and
    b) recorded portion discriminating means for discriminating a recorded portion of said record bearing medium from the information reproduced by said reproducing means.

12. An apparatus according to claim 11, wherein said reproducing means includes:
    a) a reproducing head provided so as to be movable on said record bearing medium; and
    b) means for moving one of said reproducing head and said recording bearing medium.

13. An apparatus according to claim 12, wherein said recorded portion discriminating means discriminates the recorded portion of said record bearing medium from the information reproduced from said reproducing head while one of said reproducing head and said record bearing medium is moved by said moving means.

14. An apparatus according to claim 10, further comprising:

means for detecting the loading and unloading of said record bearing medium.

15. An apparatus according to claim 10, wherein said memory means includes:
a mechanical switch having at least two states, said mechanical switch being changeable from one state to another in response to the loading or unloading of said record bearing medium.

16. An apparatus according to claim 10, wherein said changing means actuates again said discriminating means when an information that said record bearing medium is loaded or unloaded is stored in said first memory means.

17. A recording apparatus according to claim 10, wherein said medium is a disc-shaped medium.

18. A recording apparatus according to claim 10, wherein said medium is a magnetic recording medium.

19. A recording apparatus according to claim 10, wherein said medium is a medium for recording a video signal.

20. A recording apparatus according to claim 10, and further comprising display means for effecting display in response to said discriminating means.

21. A recording apparatus according to claim 20, wherein said display means is arranged to indicate a warning when a non-recorded area has been detected by said discriminating means.

22. A recording apparatus comprising:
a) loading or unloading means for loading or unloading a record bearing medium on or from said recording apparatus for recording;
b) means for recording information on the record bearing medium;
c) discriminating means for making discrimination between a part of said record bearing medium which has already been recorded on and a part thereof which has not been recorded on as yet after said recording bearing medium is loaded on the apparatus by said loading or unloading means;
d) supply means for supplying energy at least to said discriminating means; and
e) means for storing information on a state of the apparatus having said recording bearing medium loaded or unloaded when said supply means is disabled from supplying energy.

23. An apparatus according to claim 22, further comprising:
e) means for resetting information stored by said storing means.

24. An apparatus according to claim 23, wherein said resetting means resets said storing means in association with a predetermined recording operation of said recording apparatus.

25. An apparatus according to claim 22, wherein said discriminating means includes:
a) reproducing means for reproducing information from said record bearing medium; and
b) recorded portion discriminating means for discriminating a recorded portion of said record bearing medium from the information reproduced by said reproducing means.

26. An apparatus according to claim 25, wherein said reproducing means includes:
a) a reproducing head provided so as to be movable on said record bearing medium; and
b) means for moving one of said reproducing head and said recording bearing medium.

27. An apparatus according to claim 26, wherein said recorded portion discriminating means discriminates the recorded portion of said record bearing medium from the information reproduced from said reproducing head while one of said reproducing head or said record bearing medium is moved by said moving means.

28. An apparatus according to claim 22, further comprising:
means for detecting the loading or unloading of said record bearing medium.

29. An apparatus according to claim 22, wherein said storing means includes:
a mechanical switch having at least two states, said mechanical switch being changeable from one state to another in response to the loading or unloading of said record bearing medium.

30. An apparatus according to claim 22, further comprising changing means for activating said discriminating means when an information that said record bearing medium is loaded or unloaded is stored in said storing means.

31. A recording apparatus according to claim 22, wherein said medium is a disc-shaped medium.

32. A recording apparatus according to claim 22, wherein said medium is a magnetic recording medium.

33. A recording apparatus according to claim 22, wherein said medium is a medium for recording a video signal.

34. A recording apparatus according to claim 22, and further comprising display means for effecting display in response to said discriminating means.

35. A recording apparatus according to claim 34, wherein said display means is arranged to indicate a warning when a non-recorded area has been detected by said discriminating means.

36. A recording apparatus of the kind permitting replacement or interchange of a recording medium with another, comprising:
a movable recording head;
positioning means for positioning said recording head on said medium loaded in said apparatus;
memory means for mechanically storing information as to removal of said recording medium or loading of a new recording medium when recording operation of said apparatus is not active;
control means for controlling said positioning means according to said information stored at said memory means; and
means for resetting or clearing said memory means, said resetting or clearing means being arranged to reset or clear said memory means in association with a shifting movement of said recording head.

37. An apparatus according to claim 36, wherein said resetting or clearing means is arranged to reset or clear said memory means in response to an unrecorded area searching operation of the recording apparatus performed for recording.

* * * * *